US008354622B2

(12) United States Patent
Gubler et al.

(10) Patent No.: US 8,354,622 B2
(45) Date of Patent: Jan. 15, 2013

(54) ELECTRIC HOT WEDGE

(75) Inventors: Ulrich Gubler, Rotkreuz/ZG (CH);
Hannes Kühl, Sonneberg (DE)

(73) Assignee: Leister Technologies AG, Kagiswil (CH)

( * ) Notice: Subject to any disclaimer, the term of this patent is extended or adjusted under 35 U.S.C. 154(b) by 179 days.

(21) Appl. No.: 12/867,519

(22) PCT Filed: Jan. 16, 2009

(86) PCT No.: PCT/EP2009/000235
§ 371 (c)(1),
(2), (4) Date: Aug. 13, 2010

(87) PCT Pub. No.: WO2009/109260
PCT Pub. Date: Sep. 11, 2009

(65) Prior Publication Data
US 2010/0326964 A1 Dec. 30, 2010

(30) Foreign Application Priority Data
Mar. 5, 2008 (DE) .................... 20 2008 003 136 U

(51) Int. Cl.
*H05B 3/44* (2006.01)

(52) U.S. Cl. ...................................... 219/544; 219/538

(58) Field of Classification Search ............... 219/78.01, 219/85.16, 86.1, 86.22, 86.25, 86.7, 86.8, 219/117.1, 118, 119, 538, 539, 542, 543, 219/544, 546, 547, 548, 549
See application file for complete search history.

(56) References Cited

U.S. PATENT DOCUMENTS

| 2,387,566 | A | * | 10/1945 | Custers | 156/499 |
| 4,146,419 | A | * | 3/1979 | Neidhart | 156/391 |
| 5,169,052 | A | * | 12/1992 | Kaminski | 228/9 |
| 6,213,184 | B1 | * | 4/2001 | Sinclair | 156/499 |
| 6,390,168 | B1 | * | 5/2002 | Struve | 156/499 |
| 2006/0108070 | A1 | * | 5/2006 | Herz et al. | 156/499 |
| 2009/0314767 | A1 | * | 12/2009 | Chen et al. | 219/553 |

FOREIGN PATENT DOCUMENTS

| DE | 36 40 187 A1 | 6/1988 |
| DE | 10 2004 051045 A1 | 4/2006 |
| DE | 10 2006 016695 A1 | 10/2007 |
| DE | 2006016695 | * 10/2007 |
| GB | 817 913 A | 8/1959 |

OTHER PUBLICATIONS

International Search Report for corresponding International Application No. PCT/EP2009/000235 mailed Jun. 12, 2009.

* cited by examiner

*Primary Examiner* — Jenny L Wagner
*Assistant Examiner* — Mark Tornow
(74) *Attorney, Agent, or Firm* — Renner, Otto, Boisselle & Sklar, LLP

(57) ABSTRACT

The invention relates to an electric hot wedge (1) for a welding device for the seam-like connecting of plastic webs, having a welding wedge (2) and a welding wedge attachment (3) made of metal, wherein the welding wedge (2) comprises at least one electric heating resistor (13) having a heating conductor (16), which is bonded to a ceramic carrier (15) as a conductive layer (12) and is preferably protected by a ceramic cover layer. According to the invention, the welding wedge attachment (2) has a support structure (28) made of metal on the side thereof, which substantially extends across the entire length and/or width of the electric heating resistor (16) and which mechanically stabilizes the carrier (15) of the heating resistor (16).

13 Claims, 4 Drawing Sheets ( Stand der Technik )

ELECTRIC HOT WEDGE

TECHNICAL FIELD OF THE INVENTION

The invention relates to an electric hot wedge for a welding device for the seam-like connecting of plastic webs, having a welding wedge and a welding wedge attachment, wherein the welding wedge comprises at least one electric heating resistor having a heating conductor which is bonded to a ceramic carrier as a conductive layer and is preferably protected by a ceramic cover layer.

DISCUSSION OF RELATED ART

Electric hot wedges for connecting plastic webs at their edges are previously known and are used especially in automatic welding devices in a wide variety of embodiments. With overlap welding of plastic webs, the plastic webs are plasticized at their contact surfaces by means of the hot wedge and then cooled down under pressure, which results in the bonding of the plastic webs. Known welding wedges are usually made of metal and therefore have the high thermal conductivity required for the welding process. They are usually heated by means of cylindrically shaped electric heating cartridges that are embedded in the hot wedge in order to heat it to a temperature above the melting temperature of the plastic webs.

Depending on the type of plastics to be bonded, hot wedges made of different metals are frequently used, for example aluminum, copper, silver, or steel. Due to their low wear strength and corrosion strength, hot wedges made of aluminum, copper, or silver frequently need to be replaced after a short service life. Compared with these, hot wedges made of steel are more durable but require a long time to heat up and have a distinctly inferior heat distribution.

DE 10 2004 051 045 A1 discloses an electric hot wedge that, in order to avoid the disadvantages listed above, consists of a ceramic material or a composite ceramic material, with the composite ceramic material being composed of a ceramic base material and a metal or metalloid with good thermal conductivity. The disclosed hot wedge can be used for different plastic materials. It has high mechanical strength, high wear strength, and high thermal and thermal shock strength. It also has a high corrosion strength regarding chemical influences that may occur, and largely prevents the adhesion of residues of the plastic materials that were heated by it.

It is known that plastic webs made of different materials have different welding characteristics. Therefore, when welding certain plastic webs, it may happen that at the edges of the welding seam or in the edge zones bordering the welding seam wavy deformations will occur that may significantly impair the usability of the welded webs. In order to avoid such problems, DE 36 40 187 A1 discloses a welding wedge that has a decreasing thermal transfer capacity from its center toward its lateral edges. For this purpose, the hot wedge is divided in at least three sections that directly border each other and extend parallel to the feed direction, with the center section consisting of a material with high thermal conductivity, and the outer section on each side consisting of a material with low thermal conductivity. Thereby, temperature zones of different temperature are determined that are arranged next to each other and transversely to the feed direction of the hot wedge, and whose temperature differences are substantially determined by the materials used for these. The temperatures of the two outer temperature zones are directly coupled to the temperature of the center temperature zone.

Compared with metallic embodiments, ceramic parts of electric hot wedges are, to a high degree, subject to breakage under the demanding conditions of daily operations. Therefore, the invention addresses the problem by proposing an electric hot wedge wherein the danger of a breakage of the ceramic parts is minimized, and that preferably has a variably adjustable temperature profile.

SUMMARY OF THE INVENTION

According to the invention, this problem is solved by an electric hot wedge with the characteristics of Claim 1. Additional advantageous embodiments are given in the dependent claims.

According to this, the electric hot wedge according to the invention has a welding wedge attachment with a lateral support structure made of metal, which substantially extends across the entire length and/or width of the electric heating resistor and which mechanically stabilizes the ceramic carrier of the heating resistor. Depending on the specific embodiment of the welding wedge, the support structure may be arranged in the interior of the welding wedge and/or enclose the welding wedge in substantial parts. Welding wedge designates that part of the hot wedge that is in contact during the welding process with the plastic webs to be welded, while welding attachment designates that part of the hot wedge with which the welding wedge is attached non-permanently to a rack of a welding device.

In order to ensure a fast and uniform heat distribution in the welding wedge, it proved to be advantageous to heat the welding wedge directly. For this purpose, the electric heating resistor is not arranged in the welding wedge attachment, as in prior art, but rather directly in or on the welding wedge.

In order to heat the welding wedge, a heating resistor is used whose heating conductor is bonded to a ceramic carrier as a conductive layer, with the heating conductor being protected by a wear-resistant insulating cover layer. Here, it is an advantage if the ceramic heating resistor extends over a major portion of the surface of the welding wedge, with the body of the welding wedge being of a metallic or a ceramic nature.

In principle, two possible preferred embodiments are available for this. On the one hand, flat plate-like heating elements are known and available or can be produced in any size, having the structure described above. Such conventional heating elements can be embedded as a heating resistor directly into associated flat chambers of the body of the welding wedge. On the other hand, the body of the welding wedge itself may be made of an electrically insulating ceramic material, forming the ceramic carrier onto which the heating conductor is applied as a conductive layer. As a consequence, the body of the welding wedge has a thermal conductivity that is comparable to metal, without the plastic webs adhering to the contact surface of the welding wedge.

The design of the support structure of the electric hot wedge according to the invention depends on the specific embodiment of the welding wedge, specifically on the material of which it is substantially made. For example, the support structure for stabilizing the ceramic carrier of the at least one heating resistor may consist of a metal sleeve that encloses the heating resistor of the welding wedge in substantial parts, with the metal sleeve having the wedge shape that is typical for a welding wedge. Such a wedge-shaped support structure is capable of directly accepting flat ceramic heating elements or also wedge-shaped ceramic heating resistors. With a welding wedge with a ceramic body where the conductive layer is applied to the outside, the support structure may consist of one or several metal ribs or metal plates that pass through the ceramic body of the welding wedge transversely to the feed direction in order to stabilize the body. The rib or plate may be inserted loosely or embedded firmly in a channel of the ceramic body, and may be connected permanently or non-permanently to the welding wedge attachment. This may be accomplished by pressing or clamping the welding wedge, with the welding wedge expediently comprising a laterally protruding extension for attachment on the welding wedge attachment. Preferably, the support structure is made of a corrosion-resistant material and preferably has at least one hole, threaded or unthreaded, for an attachment bolt. For example, the metal rib may have a cylindrical shape and thereby may itself be implemented as an attachment bolt.

Also, a specific embodiment of the electric hot wedge is preferred where steel or silver are used as the material of the metallic welding wedge attachment, and/or where the material for the conductive layer of the heating resistor is a metal, a metal alloy, or an electrically conductive ceramic material. The conductive layer may be applied to the ceramic carrier of the heating resistor with any method commonly used in industry and known to a person skilled in the art.

In one embodiment of the invention, the welding wedge has at least two temperature zones that are preferably arranged one behind the other in the feed direction of the hot wedge, i.e. from its front edge towards its rear edge. The temperature zones may also be arranged transversely to the feed direction of the hot wedge, i.e. side by side between its lateral edges. They may either border each other directly, or may be arranged at a certain distance from each other, with the temperature zones extending only in a central area of the welding wedge, or from its front to its rear edge, or up to its lateral edges.

The temperatures of the individual temperature zones can be variably adjusted individually. For this purpose, the at least two temperature zones are associated each either with heating resistors acting independently of each other, or with a common heating resistor with heating zones of different configurations. The heating power of the associated heating resistors, or of the associated heating zones of the one heating resistor, can preferably be adjusted individually and can preferably be controlled. For the at least one heating resistor to be able to act on the temperature zones individually, it is arranged in the welding wedge itself, as described above, and not in the welding wedge attachment, as known from prior art. This means that the temperature zones of the welding wedge of the hot wedge according to the invention are heated directly, with the temperature zones each extending uniformly around the heating zone(s) of the heating resistor in question. It was found that the thermal transfer from the heating conductor of the heating resistor to the ceramic body of the welding wedge, and therefore to the plastic webs, is improved if the heating conductor is placed directly on the outside of the body of the welding wedge. This makes it possible to achieve faster heating of the electric hot wedge and a more effective temperature control.

In one embodiment of the electric hot wedge, the heating power of the welding wedge can be adjusted and/or controlled individually in the region of the temperature zones. For this purpose, the associated heating resistor in each case comprises at least one temperature sensor that is applied to the ceramic carrier in the form of a conductive layer. With the individual temperature sensors, it is possible to determine the actual temperature of the various temperature zones. The temperature data obtained in this manner can be used for the automatic temperature control of the welding wedge and/or can be displayed. It proved to be expedient if the heating resistor and the temperature sensor are formed by a common conductive layer. The measurement of the temperature is performed preferably by means of a conductor track of the heating conductor of the heating resistor. However, it is also possible to measure the temperature by means of a conductor track that is separated from the heating conductor.

If the temperature profile of the hot wedge according to the invention is generated by the effect of a single heating resistor on the temperature zones, with said resistor having only one heating conductor, the heating conductor must be designed differently in the region of each temperature zone. In an advantageous embodiment of the electric hot wedge according to the invention, the heating resistor comprises at least one conductor track as heating resistor that extends in the form of meanders and whose track cross-section or track spacing varies in design over the length of the heating resistor. It is essential that the track cross-section and/or the track spacing are different from each other at least in the region of the at least two temperature zones. Here, it is essential that the heating power per surface unit differs in the different temperature zones. In the case where two heating resistors that are not connected to each other are arranged on a common carrier in the form of conductive layers, each of which can be controlled individually, the track cross-section and/or the track spacing of the two "heating resistors" may be identical.

Below, the invention is explained in detail with reference to sample embodiments. Additional characteristics of the invention are given in the attached drawings and the description of the sample embodiments in conjunction with the claims. The individual characteristics of the invention may be realized either individually by themselves or in combinations of several in different embodiments of the invention. In a schematic representation,

DETAILED DESCRIPTION OF THE INVENTION

Figure 1:
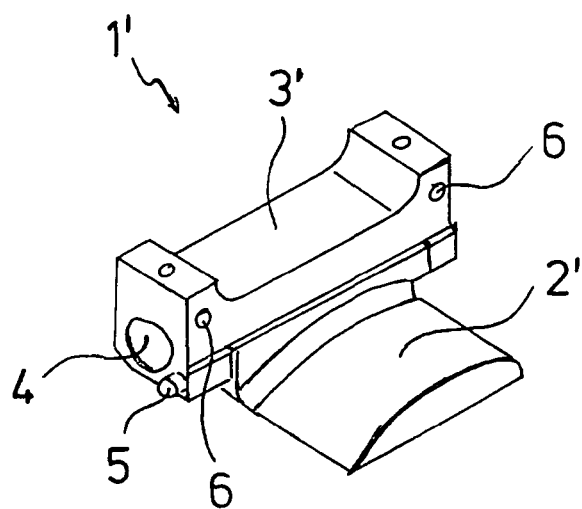
FIG. 1 shows a perspective view of a hot wedge made from one piece of metal (prior art), with a welding wedge and a welding wedge attachment.

FIG. 1 shows a known hot wedge 1' made of metal with a welding wedge 2' and a welding wedge attachment 3' that is heated by means of a conventional cylindrical heating cartridge (not shown). In the prior art, the welding wedge attachment 3' has a large hole 4 for the heating cartridge and a small hole 5 for a temperature measuring probe (not shown). In addition, attachment holes 6 for attachment to the rack of a welding device are provided on the welding wedge attachment 3'.

Figure 2:
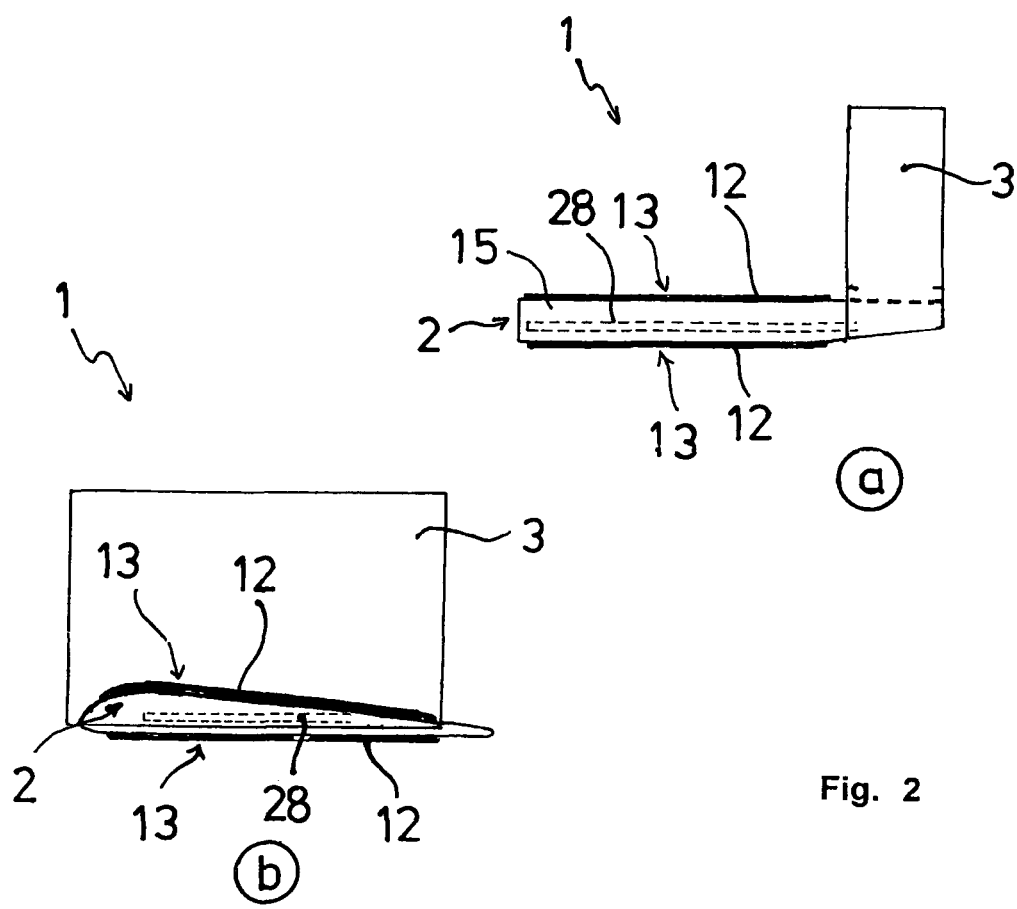
FIG. 2 shows a side and front view of a first hot wedge according to the invention, with a support structure that is arranged in the interior of the welding wedge.
Figure 3:
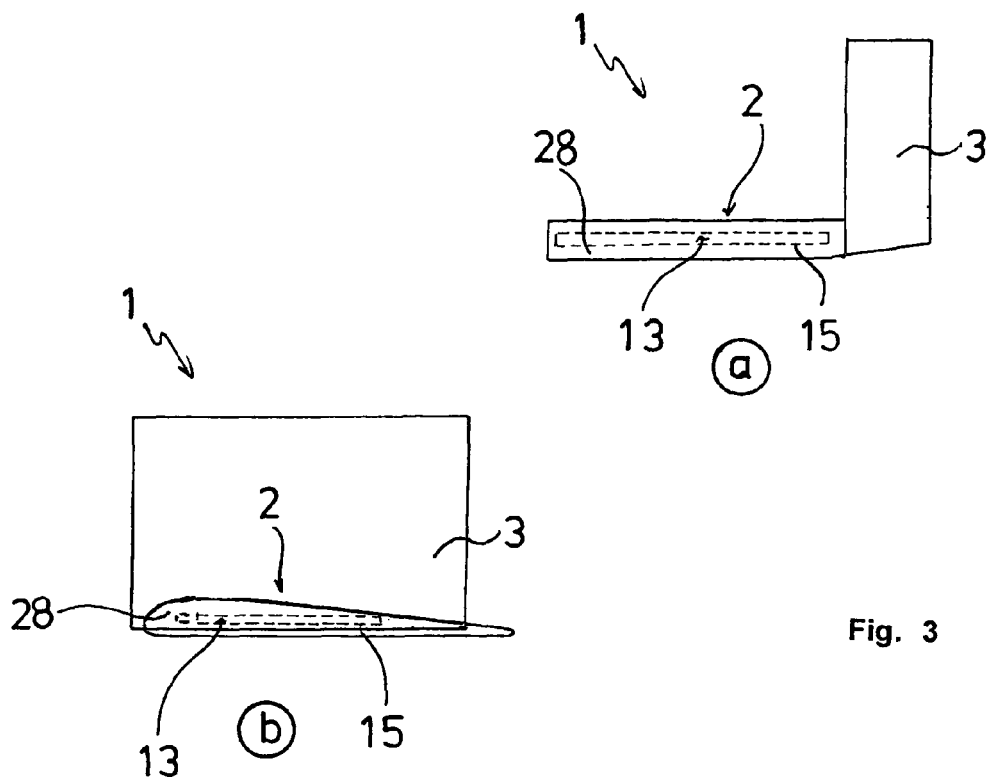
FIG. 3 shows a side and front view of a second hot wedge according to the invention, with a support structure that encloses the welding wedge.

FIGS. 2, 3 show, respectively, a first and second hot wedge 1 according to the invention, which has substantially a contour known from FIG. 1. Here, the welding wedge 2 and the welding wedge attachment 3 consist of separate parts that are non-permanently connected to each other. In the two embodiments shown here, the welding wedge attachment 3 that is preferably made of steel or silver comprises laterally a support structure 28 made of metal that substantially extends across the entire length and/or width of an electric ceramic heating resistor 13 and mechanically stabilizes said heating resistor.

In the first embodiment (FIG. 2), it is a plate-like support structure 28 that is arranged in the interior of the welding wedge 3 and extends transversely to the feed direction of the welding wedge between the lateral edges. The body of the welding wedge 2 is made of a non-conductive ceramic material and forms the carrier 15 for the conductive layer 12 of the heating resistor 13 that is applied to the body on the outside. In the second embodiment (FIG. 3), the support structure 28 encloses substantial parts of the welding wedge 2. At least the heating resistor 13 is considered to be a substantial part; it is plate-shaped and its conductive layer 12 is applied to a plane ceramic carrier plate 15. For this purpose, the support structure 28 that has the shape of a wedge-shaped metal sleeve and is made of a metal block, has a receptacle space in which the heating resistor 13 is embedded. In both embodiments, the conductive layer 12 is preferably protected by a ceramic cover layer (not shown in FIGS. 2, 3). In addition, the support structure 28 is made of a corrosion-resistant metal in both cases. The electrical connecting lines for contacting the heating resistor are not shown in any figures of the drawing. This is achieved using methods familiar to a person skilled in the art.

Figure 4:
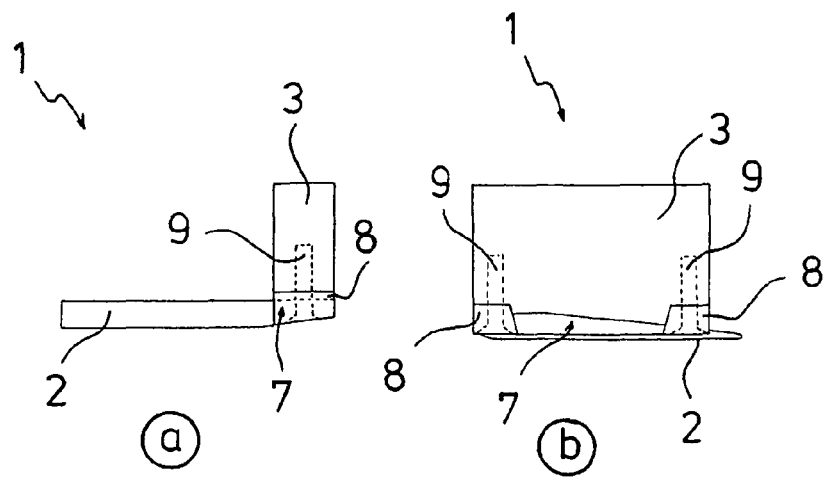
FIG. 4 shows a side and front view of a first type of attachment of the hot wedges from the FIGS. 2, 3.
Figure 5:
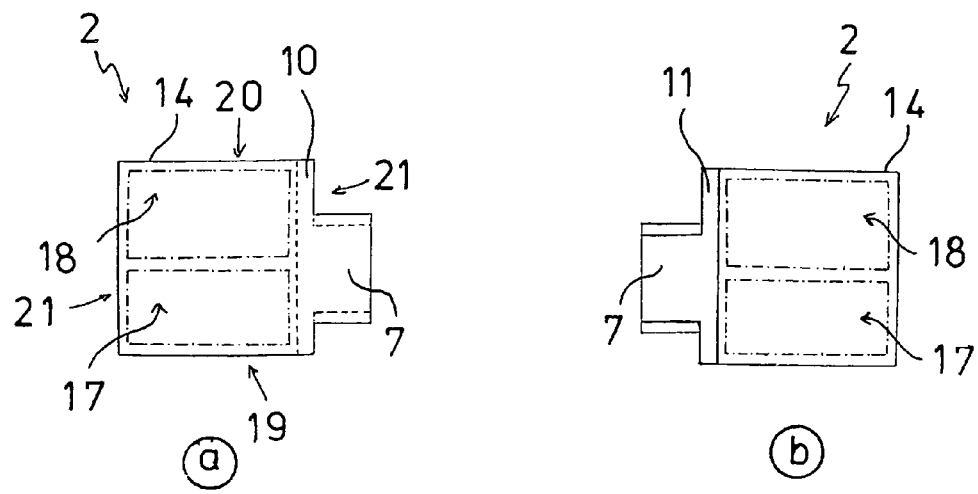
FIG. 5 shows various views of the welding wedge from FIG. 4, with heating resistors applied on the outside of the body of the welding wedge.
Figure 5:
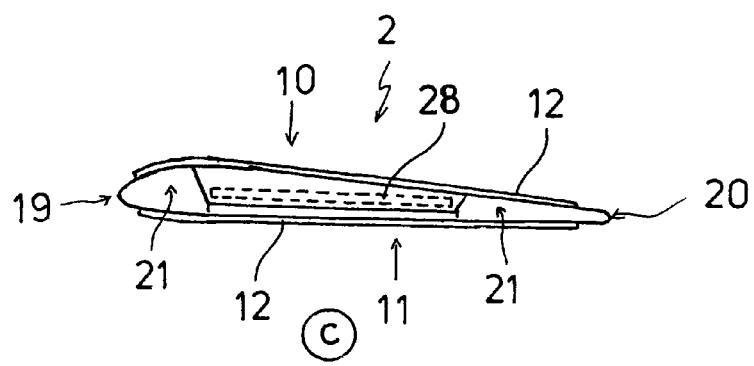

In the schematic views 4a, 4b, FIG. 4 shows a first type of attachment of the hot wedge 1 according to the invention represented in the FIGS. 2, 3. The welding wedge 2 that is shown again in other views in FIG. 5 is made of ceramic material and is attached to the welding wedge attachment by means of clamping. For this purpose, and as can be seen in the FIGS. 5a, 5b, the welding wedge 2 preferably has a conical extension 7 that extends laterally from the welding wedge 2 and is pressed against the welding wedge attachment 3 by two wedge-shaped counter pieces 8 of the hot wedge 1. The counter pieces 8 are fixed on the welding wedge attachment 3 by the attachment bolts 9. The attachment structure 28 of the welding wedge 2 extends into the extension 7.

Figure 6:
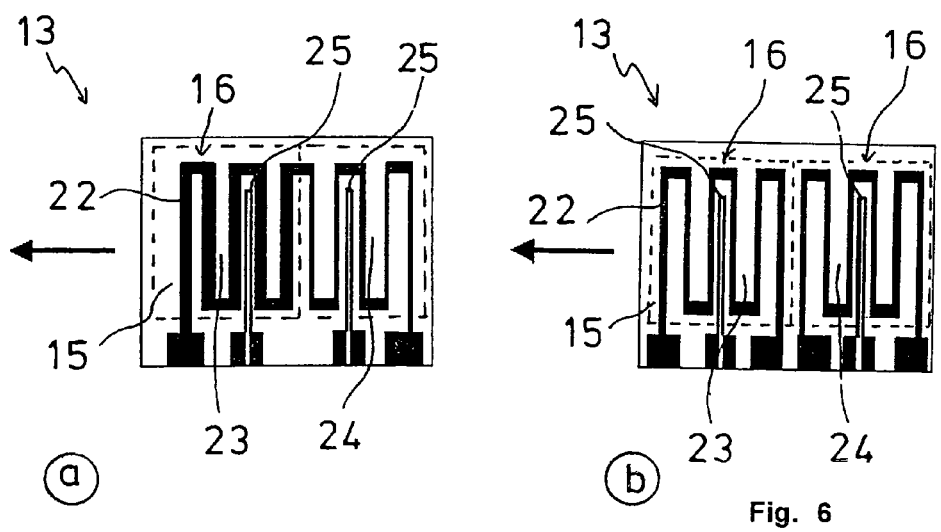
FIG. 6 shows various embodiments of the conductive layer of the heating resistor for the welding wedge according to FIGS. 3, 4.

In the FIGS. 5a, 5b, FIG. 5 shows the welding wedge 2 from FIG. 2 in a plan view from above and from below. As can be seen from the enlarged side view 5c, the welding wedge 2 has on its top side 10 and on its underside 11a conductive layer 12 of a heating resistor 13 that is protected by a cover layer (not shown). The ceramic body 14 of the welding wedge 2 forms a carrier 15 for a heating conductor 16 that consists of a structure of the conductive layer 12. As FIG. 6 shows, the conductive layer 12 has different structures in different areas of the top/underside 10, 11. The areas of different structure determine the temperature zones 17, 18, with the temperature zones 17 and 18 being arranged opposite each other on the top side 10 and the underside 11 of the welding wedge 2. The two temperature zones 17, 18 are arranged one behind the other in the feed direction of the hot wedge 1, from a front edge 19 to a rear edge 20, and extend laterally up to the lateral edges 21 of the welding wedge 2, with their temperatures being variably and individually adjustable. In a similar way, in the second embodiment (not shown in detail) the temperature zones 17, 18 are determined by different structures of the conductive layer 12 of the plate-shaped heating resistor 13 that extends, in the interior of the welding wedge 2 between the lateral edges 21, over a substantial part of the length of the hot wedge 1, as measured in the feed direction.

By way of example, FIG. 6 shows two structures of the conductive layer 12. The heating resistor 13 that is preferably configured identically on the top/underside 10, 11 of the welding wedge 2, comprises conductor tracks 22 that extend between the lateral edges 21 in the form of meanders and whose track cross-section or track spacing varies in design over the length of the heating resistor 13 in the embodiment shown in FIG. 6a. In a first heating section 23 of the heating resistor 13 that is associated with the first temperature zone 17, the track widths of the conductor tracks 22 are greater than in the second heating section 24 that determines the second temperature zone 18. In addition, the spacing of the conductor tracks 22 in the heating sections 23, 24 is also different. Compared with the adjacent temperature zone 18, the temperature zone 17 that is located in front in relation to the feed direction of the hot wedge 1 has a lower temperature so that the plastic webs (not shown) are preheated in the temperature zone 17 and are thereafter melted in the temperature zone 18. It is also possible to structure the conductive layer 12 of the top/underside 10, 11 differently in order to bond plastic webs of different thicknesses. FIG. 6b shows two heating conductors 16 that are applied in sequence on the body 14 on a top side 10 and/or an underside 11. The heating conductors 16 are not connected with each other and can therefore be controlled and adjusted individually. They form the heating sections 23, 24 of the heating resistor 13. In the two embodiments shown here, two temperature sensors 25 are each arranged in the heating sections 23, 24 between the meandering conductor tracks 22.

Figure 7:
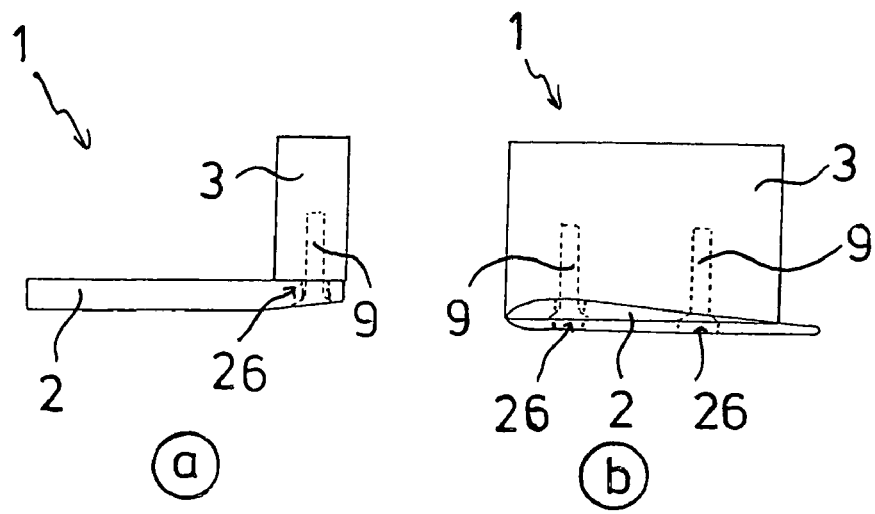
FIG. 7 shows a side and front view of a second type of attachment of the hot wedges from the FIGS. 2, 3.

In the views 7a, 7b, FIG. 7 shows a second type of attachment of the hot wedge 1 according to the invention. Here, however, the laterally protruding extension 7 extends from the front edge 19 to the rear edge 20 of the welding wedge 2. It also has bolt holes 26 perpendicular to the extension 7 that continue in the attachment structure 28 and through which the attachment bolts 9 extend by means of which the welding wedge 2 is pressed against the welding wedge attachment 3.

Figure 8:
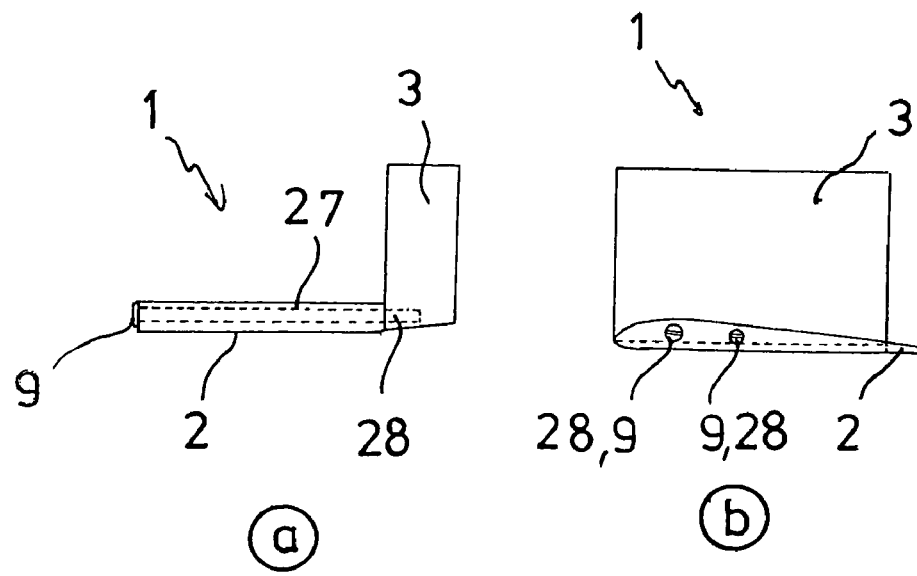
FIG. 8 shows a side and front view of a second type of attachment of the hot wedges from the FIGS. 2, 3.

In the views 8a, 8b, FIG. 8 shows a third type of attachment for the hot wedge 1 according to the invention, where the heating resistor 13 is configured as described above, and where the welding wedge 2 is attached to the welding wedge attachment 3 by means of attachment bolts 9 that penetrate the welding wedge 2, perpendicular to the lateral edges 21. For this purpose, the welding wedge 2 comprises transversely extending channels 27 in which the attachment bolts 9 extend as a metallic support structure 28 in the shape of two ribs.

The invention claimed is:

1. An electric hot wedge for a welding device for the seam-like connecting of plastic webs, having a welding wedge and a welding wedge attachment made of metal, wherein the welding wedge comprises at least one electric heating resistor having a heating conductor, which is bonded to a ceramic carrier as a conductive layer, and wherein the welding wedge attachment has a support structure made of metal on the side thereof, which substantially extends across the entire length and/or width of the electric heating resistor and which mechanically stabilizes the carrier of the heating resistor.

2. An electric hot wedge as claimed in claim 1, wherein the support structure encloses the welding wedge in substantial parts.

3. An electric hot wedge as claimed in claim 1, wherein the metal of the welding wedge attachment is steel or silver.

4. An electric hot wedge as claimed in claim 1, wherein the electrical heating resistor has a flat shape, with the support structure having a wedge shape, and the heating resistor being held in the interior of the support structure.

5. An electric hot wedge as claimed in claim 1, wherein the electrical heating resistor has a flat, wedge-like shape, with the support structure being held in the interior of the heating resistor.

6. An electric hot wedge as claimed in claim 1, wherein the welding wedge is non-permanently attached to the welding wedge attachment.

7. An electric hot wedge as claimed in claim 1, wherein a metal, a metal alloy, or an electrically conductive ceramic material, is used as the material for the conductive layer.

8. An electric hot wedge as claimed in claim 1, wherein the welding wedge has at least two temperature zones with individually and variably adjustable temperature that are arranged one behind the other in the feed direction of the hot wedge.

9. An electric hot wedge as claimed in claim 1, wherein the heating resistor comprises a temperature sensor that is applied as a conductive layer to the carrier, with the heating resistor and the temperature sensor being formed by a common conductive layer.

10. An electric hot wedge as claimed in claim 1, wherein the heating resistor comprises at least one conductor track as heating conductor that extends in the form of meanders, with the cross-section and/or the spacing of the conductor track differing over the length of the heating resistor.

11. An electric hot wedge as claimed in claim 1, wherein the heating conductor is protected by a ceramic cover layer.

12. An electric hot wedge for a welding device for the seam-like connecting of plastic webs, having a welding wedge and a welding wedge attachment made of metal, wherein the welding wedge comprises at least one electric heating resistor having a heating conductor, which is bonded to a ceramic carrier as a conductive layer, and wherein the welding wedge attachment has a support structure made of metal on the side thereof, which substantially extends across the entire length and/or width of the electric heating resistor and which mechanically stabilizes the carrier of the heating resistor, wherein the support structure is arranged in the interior of the welding wedge.

13. An electric hot wedge as claimed in claim 12, wherein the heating conductor is protected by a ceramic cover layer.

* * * * *